April 7, 1936.  H. LEADER  2,036,815

ELECTRIC WATER HEATER

Filed Feb. 23, 1935

INVENTOR

Harold Leader

BY Robt. W. Pearson

ATTORNEY

Patented Apr. 7, 1936

2,036,815

UNITED STATES PATENT OFFICE 2,036,815

ELECTRIC WATER HEATER

Harold Leader, Los Angeles, Calif., assignor to Western Water Heater Corporation Ltd., Los Angeles, Calif.

Application February 23, 1935, Serial No. 7,791

8 Claims. (Cl. 219—39)

This invention relates to an electric water heater means that will not cause lime to be deposited upon the heating elements or tubes.

It is an object of the invention to provide an efficient construction of the above stated character that may readily be installed within hot water heater tanks at the time they are manufactured or after their installation.

It is well known that when the temperature of water containing lime is raised by means of highly heated metallic elements in direct contact therewith, to produce a supply of hot water, such metallic elements become coated with the lime, thus reducing the efficiency of the heater and also causing the heat to act more injuriously upon the heated metal. It is the purpose of this invention to overcome these objectionable features by a more efficiently operating means than has hitherto been devised. The injurious results caused by lime collecting on the heating elements and adjacent parts are overcome, for, although said elements contact with water, yet such water is trapped within an auxiliary tank, and as there is no flow of water through said tank only a negligible amount of lime can be deposited therefrom.

Other objects and advantages of the invention may hereinafter appear.

Referring to the accompanying drawing, which illustrates what are at present deemed to be preferred embodiments of the invention, Fig. 1 is a view partly in side elevation, and partly sectioned on line 1—1 of Fig. 2.

Figure 1:
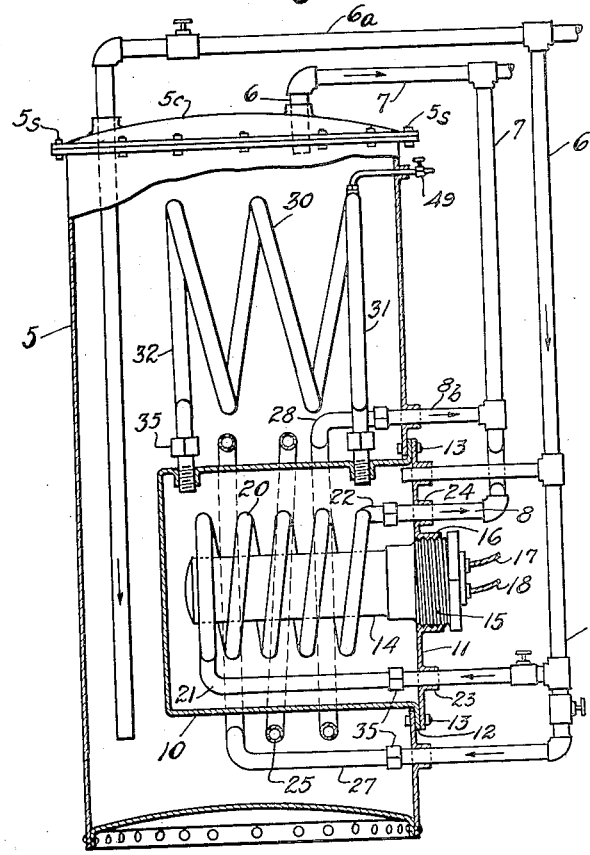
Figure 2:
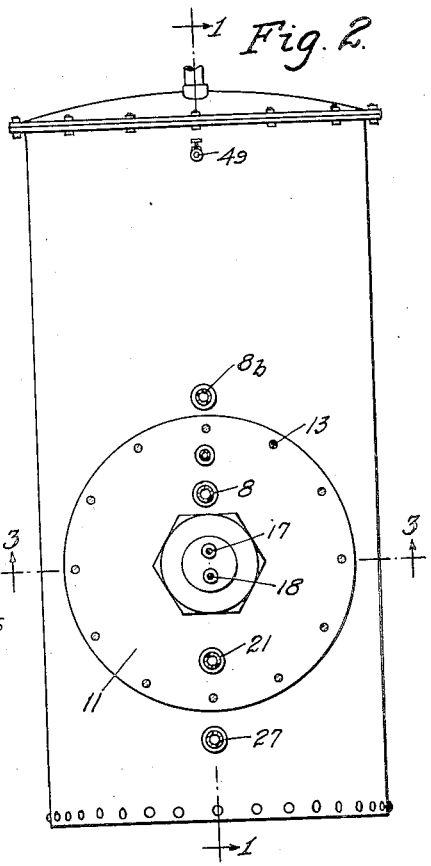
Fig. 2 is a side elevation looking at the right hand side of the construction as shown in Fig. 1.

Referring in detail to the drawing, in which is shown an elongated upstanding main water tank 5 connected up as for use as in a heater for water supplied under city pressure, having the cold water supply pipes 6 and 6a and the hot water delivery pipe 7.

An auxiliary water heating tank 10 is built into the main tank 5, being supported by a cover plate 11 which is bolted or otherwise secured in a water tight manner over an opening provided therefor in one side of the main tank. The outer side of said tank 10 is shown surrounded by an outwardly directed flange 12, and the attaching bolts or rivets 13 grip said flange between the wall of the main tank and the marginal portion of the cover plate 11.

Means are provided to heat electrically and in a direct manner the liquid trapped within the auxiliary tank 10, the heat being conducted from said tank to the liquid within the main tank to be delivered therefrom for use in a heated condition. For this purpose an electric heating element 14 is mounted in the auxiliary tank, said element at its outer end having a screw threaded connection 15 within an outwardly directed internally threaded annular flange 16 provided therefor on the cover plate 11. Said element is supplied with current through the wires 17 and 18.

A water heating pipe coil 20 is extended around and in a spaced relation to the heating element 14, said coil having a cold water inlet extension 21 leading from the cold water supply pipe 6, and a heated water outlet extension 22. The pipes 21 and 22 lead through the cover plate 11 in a water tight manner, outwardly directed annular flanges 23 and 24 being respectively provided for these pipes. Pipe 21 communicates with the cold water supply pipe 6 and pipe 22 communicates with a branch 8 of the hot water delivery pipe 7.

The auxiliary heating tank 10 is shown of a cylindrical shape. Around this tank extends concentrically and in spaced relation thereto another water heating coil 25. Cold water is supplied to this coil by pipe 27, and heated water is conducted therefrom by pipe 28, these pipes respectively communicating with cold water supply pipe 6 and the branch 8b of the hot water delivery pipe 7. Said pipes 27 and 28 are led in a liquid tight manner through the front wall of the main tank 5 below and above the opening provided therein to admit the auxiliary tank 10.

As an additional means for conducting heat from the contents of the auxiliary tank to the liquid within the main tank, an upper water coil 30 is mounted therein, the front end portion 31 of said coil being led through the front part of the top wall of the auxiliary tank and the rear end portion 32 of said coil being led into the rear portion of the auxiliary tank. In order to provide for the convenient mounting of the upper coil 30 the main tank may be furnished at its upper end with a removable head 5c attached by cap screws 5s.

The cover plate 11 of the auxiliary tank 10 is made sufficiently strong to support in a dependable manner not only its own weight, but also the weight of the coil 31 mounted thereon.

The various sections of pipe are united to each other by couplings 35 which are screw threaded.

Figure 4:
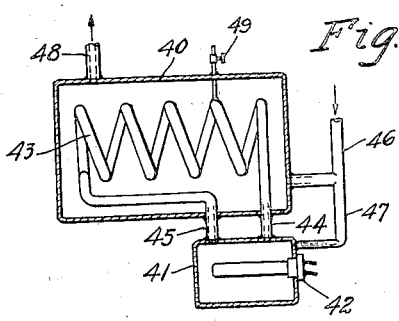
Fig. 4 is a side elevation showing a modification of the heating element and adjacent parts, the tanks being sectioned.
Figure 3:
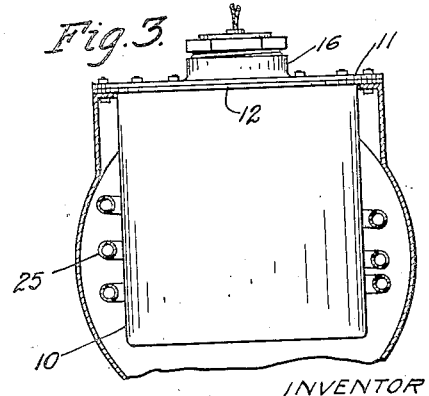
Fig. 3 is a transverse section looking up from line 3—3 of Fig. 2.

In Fig. 4 is shown a modification wherein a main tank 40 is heated from an auxiliary tank 41, the latter having therein an electric heating element 42 the connections of which are constructed the same as have already been described for the heating element 14 shown in Fig. 1.

The pipe coil 43 of Fig. 4 replaces the coil 30 of Fig. 1 and communicates with the tank 41 through end pipes 44 and 45. Cold water is supplied under pressure to tank 40 through pipe 46, a branch 47 of which communicates with the tank 41. 48 is the hot water delivery pipe.

It will be noted that all parts of the heater which contains water traps are tapped by connections 49 for air relief.

In both forms of the invention the auxiliary tank contains trapped water, nevertheless the contents thereof is in free communication with the water supply pipes of the city or other water supply system with which it is connected. Therefore, in the event of an overheating of the contents of the auxiliary tank, pressure relief back into its supply pipe will be afforded.

The claimed invention is not limited to the specific means shown for relieving the pressure within the auxiliary tank when the water in said tank is heated, but other relief means, of a controlled or restricted character, may be provided.

I claim:

1. In a structure of the kind described, a main liquid reservoir, an auxiliary liquid reservoir which is in an inset relation to said main reservoir the contents of said reservoirs being separated by a single heat conducting wall, said auxiliary reservoir being of a liquid tight character with the exception of a liquid supply opening, a conduit supplying liquid under pressure through said opening, and an electric heat generating means within said auxiliary reservoir to heat the liquid therewithin and thereby conduct heat to the liquid within the main reservoir.

2. In a structure of the kind described, a main liquid reservoir, an auxiliary liquid reservoir which is in an inset relation to said main reservoir, and a water heating coiled pipe within said main reservoir, said pipe containing trapped water and being at its opposite ends in communication with said auxiliary reservoir.

3. In a structure of the kind described, a main liquid reservoir, an auxiliary liquid reservoir which is in an inset relation to said main reservoir and a water heating coiled pipe containing trapped water and supported by end portions which upstand from and are in communication with said auxiliary tank.

4. In a water heating construction, a main water heating tank, an auxiliary tank the contents of which is separated from the contents of said main tank by a single wall of heat conducting material, means within said auxiliary tank to electrically heat its contents, a water heating coil within said main tank adjacent to said auxiliary tank and surrounding the latter tank in a spaced relation thereto, and piping for said tanks including hot water delivery pipes communicating with said main tank and with said coil.

5. In a water heating construction, a main tank having an opening in its wall, an auxiliary tank insertable within said opening, said auxiliary tank having an open side or end surrounded by an outwardly directed flange seated upon the part of the wall of said main tank adjacent to its said opening, a cover plate overlying the open side of said auxiliary tank together with its said flange, securing means for said cover plate extending through said flange and main tank wall, and means supported by said cover plate within said auxiliary tank to heat the contents thereof electrically.

6. In a water heating construction, a main water heating tank, an auxiliary water heating tank the contents of which is separated from the contents of said main tank by a heat conducting wall, means within said auxiliary tank to electrically heat its contents, said main water heating tank having a controllable circulation of water for heating and consumption, and said auxiliary water heating tank having a trapped body of water constantly in communication with a water supply means independently of the contents of said main tank.

7. In a structure of the kind described, a main liquid reservoir, an auxiliary liquid reservoir which is in an inset relation to said main reservoir, and a water heating pipe within said main reservoir, said pipe containing trapped water and being at its opposite ends in communication with said auxiliary reservoir.

8. In a structure of the kind described, a main liquid reservoir, an auxiliary liquid reservoir which is positioned in an inset relation to said main reservoir, and a water heating pipe within said main reservoir, said pipe containing trapped water and being at its opposite ends in communication with said auxiliary reservoir.

HAROLD LEADER.